Jan. 15, 1924.

J. W. KLEIN

TREE HOLDER

Filed June 3, 1921

1,481,015

INVENTOR
John W. Klein
BY
J. H. Procter
ATTORNEY

Patented Jan. 15, 1924.

1,481,015

UNITED STATES PATENT OFFICE.

JOHN W. KLEIN, OF WILKINSBURG, PENNSYLVANIA.

TREE HOLDER.

Application filed June 3, 1921. Serial No. 474,622.

*To all whom it may concern:*

Be it known that I, JOHN W. KLEIN, a citizen of the United States, and a resident of Wilkinsburg, in the county of Allegheny and State of Pennsylvania, have invented a new and useful Improvement in Tree Holders, of which the following is a specification.

My invention relates to supporting devices and particularly to tree holders.

One object of my invention is to provide a tree holder that shall permit the use of a fluid containing receptacle for the butt of the tree.

Another object of my invention is to provide a tree holder that is self sustaining.

Another object of my invention is to provide a tree holder that shall not require the butt of the tree to be especially prepared to receive it.

A further object of my invention is to provide a tree holder, of the above indicated character, that shall be light in weight, inexpensive to construct, compact in form and effective in operation.

In practicing my invention, I provide a circular base member, a plurality of braces pivotally mounted thereon for gripping the tree a relatively great distance from the butt and a second plurality of relatively shorter braces for gripping the tree a sufficient distance from its butt to permit the insertion of a fluid-containing receptacle. The fluid such as water will keep the tree fresh for a long period of time. I am aware that trees have been provided with water-containing receptacles to which the supports have been fastened but such devices are expensive and require the use of relatively large receptacles. In my invention, I overcame this in that my supporting device is so constructed that a relatively small water-containing receptacle may or may not be used as desired and the water may be changed without dismantling the tree. My invention also permits the holder to be folded into a substantially flat, thin device when not in use.

Figure 1:
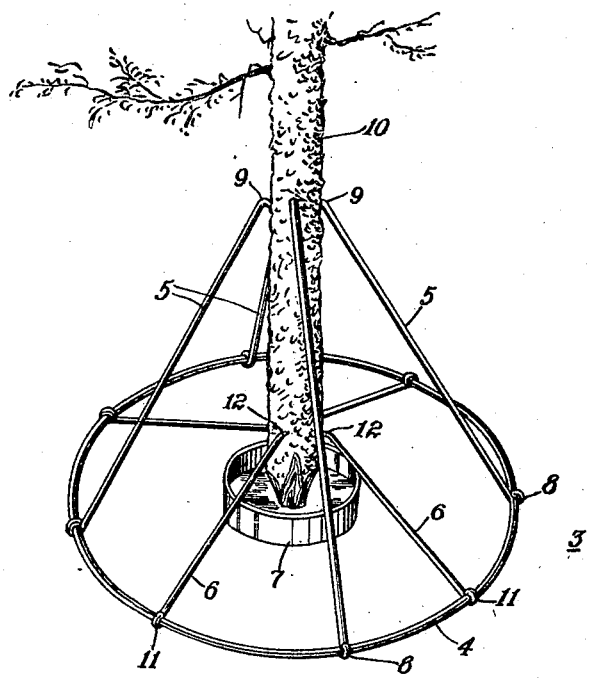
Figure 2:
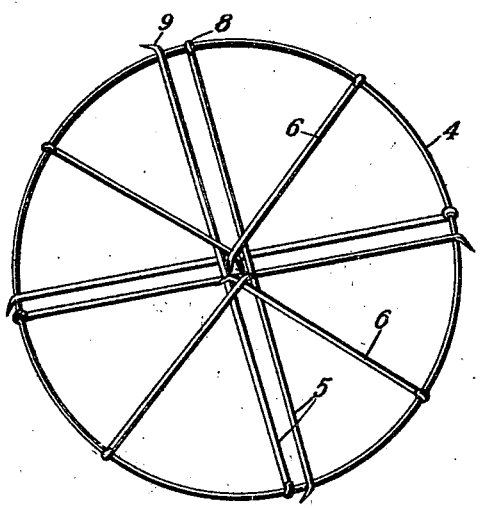

Fig. 1 of the accompanying drawings is a perspective view of a tree holder embodying my invention; and Fig. 2 is a plan view of the tree holder shown in Fig. 1 in the folded position.

A tree holder 3, embodying my invention, comprises, in general, a base member 4, two sets of braces 5 and 6 and a fluid-containing receptacle 7.

The base member 4 is preferably circular in shape and is preferably constructed of round wire. The braces or supports 5 are relatively long and are pivoted to the wire ring 4 at one end 8 and equally disposed there around. The other ends 9 of the braces 5 are pointed to be driven into the tree 10 to be supported. These braces 5 cooperate with the base for supporting the tree. The base 4 need not be secured to the floor as it is sufficiently large to be self supporting.

The braces 6 are similarly pivoted to the ring 4 at their lower ends 11 and pointed at their upper ends 12 to be driven into the tree. The braces 6 are shorter than the braces 5 and are adapted to engage the tree a short distance from its butt. The two sets of braces 5 and 6 cooperate with the ring 4 to effectively support the tree. The braces 6 engage the tree at a sufficient distance from its butt to permit the receptacle 7 to be disposed around the butt of the tree. When this receptacle is filled with water or other suitable fluid it maintains the tree in a fresh condition for a relatively long period of time.

The braces 5 are slightly longer than the diameter of the ring 4 against which they rest when folded and the braces 6 are slightly longer than the radius of the ring to rest against the braces 5 when folded. It will be seen that the various braces fold flat against the ring and thus provide a compact structure.

It will be noted that since the butt of the tree is not secured it is not necessary to saw the same off even or to point the same as in other forms of tree holders.

While I have illustrated a holder having eight supports, any number of supports may be used and other changes may be made therein without departing from the spirit and scope of the invention as set forth in the appended claims.

I claim as my invention:

1. A tree holder comprising a base member, a plurality of equally spaced supports pivoted to the base member for engaging the tree at a relatively great distance from its butt and a plurality of relatively short equally spaced positioning members pivoted to the base for engaging the tree at a relatively short distance from its butt.

2. A tree stand comprising a base member, a plurality of relatively long brace members pivoted to the base member and adapted to fold flat thereagainst and extending from side to side of the base member when not in use, and a plurality of relatively shorter brace members pivoted to the base member and adapted to extend partly across the base member and to fold against the other brace members, when not in use.

In testimony whereof, I have hereunto subscribed my name this 24th day of May, 1921.

JOHN W. KLEIN.